US009969223B2

(12) United States Patent
Higashiura (10) Patent No.: US 9,969,223 B2
(45) Date of Patent: May 15, 2018

(54) PNEUMATIC TIRE

(71) Applicant: Sumitomo Rubber Industries, Ltd., Kobe-shi, Hyogo (JP)

(72) Inventor: Kazuki Higashiura, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 120 days.

(21) Appl. No.: 15/058,884

(22) Filed: Mar. 2, 2016

(65) Prior Publication Data

US 2016/0288580 A1 Oct. 6, 2016

(30) Foreign Application Priority Data

Apr. 3, 2015 (JP) ................................. 2015-076453

(51) Int. Cl.
*B60C 11/03* (2006.01)
*B60C 11/12* (2006.01)
*B60C 11/13* (2006.01)

(52) U.S. Cl.
CPC ...... *B60C 11/0327* (2013.01); *B60C 11/0302* (2013.01); *B60C 11/0306* (2013.01);
(Continued)

(58) Field of Classification Search
CPC . B60C 11/03; B60C 11/0302; B60C 11/0304; B60C 11/0306;
(Continued)

(56) References Cited

U.S. PATENT DOCUMENTS 4,057,089 A * 11/1977 Johannsen .......... B60C 11/0302
152/209.18
4,424,845 A * 1/1984 Baus ................... B60C 11/0306
152/209.1
(Continued)

FOREIGN PATENT DOCUMENTS

DE 102011065916 A1 6/2013
EP 0609195 * 1/1994
(Continued)

OTHER PUBLICATIONS

Extended European Search Report for European Application No. 16160075.4, dated Aug. 31, 2016.

*Primary Examiner* — Eric Hug
(74) *Attorney, Agent, or Firm* — Birch, Stewart, Kolasch & Birch, LLP (57) ABSTRACT

A pneumatic tire includes a tread portion including a first tread pattern and a second tread pattern. The first tread pattern and the second pattern are formed as substantially symmetrical design to the tire equator and arranged such that pattern phases thereof are shifted one another in a circumferential direction of the tire. Each of the first tread pattern and the second tread pattern is provided with lateral inclined grooves each extending axially inwardly with an inclination from a tread edge to an axially inner end located near the tire equator, an inner connecting groove connecting between a pair of circumferentially adjacent lateral inclined grooves, and an outer connecting groove connecting between a pair of circumferentially adjacent lateral inclined grooves. A central connecting grooves is arranged to connect between a pair of axially adjacent lateral inclined grooves.

12 Claims, 3 Drawing Sheets

(52) U.S. Cl.
CPC ... *B60C 11/1236* (2013.01); *B60C 2011/0372* (2013.01); *B60C 2011/0374* (2013.01); *B60C 2011/0388* (2013.01)

(58) Field of Classification Search
CPC ..... B60C 2011/0339; B60C 2011/0358; B60C 2011/0372; B60C 2011/0374; B60C 11/11; B60C 11/0327; B60C 2011/0337; B60C 11/12; B60C 11/1236
USPC ......... 152/209.3, 209.8, 209.18, 209.28, 903
See application file for complete search history.

(56) References Cited

U.S. PATENT DOCUMENTS

| | | | |
|---|---|---|---|
| 4,667,717 A | * | 5/1987 | Graas .................. B60C 11/0302 152/209.18 |
| D379,449 S | * | 5/1997 | Graas .......................... D12/563 |
| D464,609 S | * | 10/2002 | Johenning .................... D12/558 |
| 2011/0067794 A1 | * | 3/2011 | Endou ................. B60C 11/0302 152/209.18 |
| 2011/0168312 A1 | * | 7/2011 | Pineau ................ B60C 11/0302 152/209.28 |
| 2013/0192732 A1 | * | 8/2013 | Itoi ........................ B60C 11/11 152/209.8 |

FOREIGN PATENT DOCUMENTS

| | | | |
|---|---|---|---|
| EP | 0609195 A1 | | 8/1994 |
| JP | 9-188109 | * | 7/1997 |
| JP | 9-188109 A | | 7/1997 |
| JP | 2006-298202 A | | 11/2006 |
| JP | 2013-136333 A | | 7/2013 |
| WO | WO 2013/079343 | * | 6/2013 |
| WO | WO 2014/071790 A1 | | 6/2014 |

* cited by examiner

PNEUMATIC TIRE

BACKGROUND ART

Field of the Invention

The present invention relates to pneumatic tires, and in particular relates to a winter tire that may improve steering stability on dry, ice and snow, in well balanced manner.

Description of the Related Art

Japanese Unexamined Patent Application Publication No. 2006-298202 discloses a winter tire having an improved traction on snow. The winter tire includes a tread portion having a block pattern including a plurality of blocks separated by a plurality of circumferential and continuously extending main grooves and a plurality of lateral grooves. This tread pattern may offer grip in the circumferential direction by snow-shearing force obtained through the lateral grooves, and therefore traction and braking performance on snow can be achieved. Furthermore, the tread pattern may also offer lateral grip by snow-shearing force obtained through the main grooves, and therefore steering stability on snow can be achieved. Note that the concept of steering stability means not only cornering performance but also straight traveling stability.

In general, reaction force from the ground acting on the tread portion, when straight traveling or braking, would act on the lateral grooves mainly, and would be hardly to act on the circumferential main grooves. On the other hand, reaction force from the ground acting on the tread portion, when cornering, would act on the main grooves mainly, and would be hardly to act on the lateral grooves. Accordingly, there is a tendency where the main grooves and the lateral grooves function independently, and snow pillar compressed in either grooves tends to break easily. Thus, there was a problem that the above mentioned conventional tire may not offer sufficient traveling performance on snow.

SUMMARY OF THE INVENTION

In view of the above problems in the conventional art, the present invention has an object to provide a pneumatic tire capable of improving steering stability on dry, ice and snow, in well balanced manner.

According to one aspect of the invention, a pneumatic tire includes a tread portion including a first tread pattern formed between a tire equator and one of tread edges, and a second tread pattern formed between the tire equator and the other one of the tread edges. The first tread pattern and the second pattern are formed as substantially symmetrical design with respect to the tire equator, and the first tread pattern and the second pattern are arranged such that pattern phases thereof are shifted one another in a circumferential direction of the tire. Each of the first tread pattern and the second tread pattern is provided with a plurality of lateral inclined grooves each extending axially inwardly with an inclination from the tread edge to an axially inner end located near the tire equator without reaching the tire equator, an axially inner connecting groove having an opposite inclination to the inclination of the lateral inclined grooves and connecting between a pair of circumferentially adjacent lateral inclined grooves, and an axially outer connecting groove having an opposite inclination to the inclination of the lateral inclined grooves and connecting between a pair of circumferentially adjacent lateral inclined grooves. A plurality of central connecting grooves are arranged axially inward of the inner connecting grooves of the first and second tread patterns. Each central connecting groove extends across the tire equator and connects one of the lateral inclined grooves arranged on the first tread pattern with one of the lateral inclined grooves arranged on the second tread pattern.

In another aspect of the invention, the tread portion may not be provided with any circumferentially and continuously extending straight main grooves.

In another aspect of the invention, the outer connecting groove may have an end that forms a T-shaped groove junction with one of the lateral inclined grooves, the inner connecting groove may have an end that forms a T-shaped groove junction or a cross-shaped groove junction with one of the lateral inclined grooves, and the central connecting groove may have an end that forms a T-shaped groove junction with one of the lateral inclined grooves.

In another aspect of the invention, each of the lateral inclined grooves may include a groove center line including an intersection point A with the tread edge, an intersection point B with an axially inner end of the outer connecting groove, an intersection point C with an axially inner end of the inner connecting groove and an intersection point D with the central connecting groove, and angles θab, θbc and θcd may satisfy the following relations:

$$\theta ab < \theta bc < \theta cd,$$

$$25(\deg.) < \theta ab < 35(\deg.),$$

$$45(\deg.) < \theta bc < 55(\deg.), \text{ and}$$

$$55(\deg.) < \theta cd < 65(\deg.),$$

where "θab" is an angle of a segment AB extending from the point A to the point B with respect to an axial direction of the tire, "θbc" is an angle of a segment BC extending from the point B to the point C with respect to the axial direction of the tire, and "θcd" is an angle of a segment CD extending from the point C to the point D with respect to the axial direction of the tire.

In another aspect of the invention, an axial length Lab of the segment AB, an axial length Lbc of the segment BC and an axial length Lcd of the segment CD may satisfy the following relations:

$$Lab < Lbc < Lcd,$$

$$0.39 \times TW \leq Lab \leq 0.47 \times TW,$$

$$0.33 \times TW \leq Lbc \leq 0.41 \times TW, \text{ and}$$

$$0.27 \times TW \leq Lcd \leq 0.36 \times TW,$$

where "TW" is a tread half width which is an axial distance measured from the tire equator to one of the tread edges.

In another aspect of the invention, the tread portion may include a central block surrounded by a pair of circumferentially adjacent lateral inclined grooves, the inner connecting groove and a pair of central connecting groove, a middle block surrounded by a pair of circumferentially adjacent lateral inclined grooves, the inner connecting groove and the outer connecting groove, and a shoulder block surrounded by a pair of circumferentially adjacent lateral inclined grooves, the outer connecting groove and one of the tread edges.

In another aspect of the invention, the inner connecting groove may include an extended portion that extends across one of the lateral inclined grooves and terminates within the middle block.

In another aspect of the invention, the central block may be provided with a sipe extending substantially in an axial direction of the tire.

In another aspect of the invention, the middle block may be provided with a sipe extending substantially in parallel with the inner connecting groove.

In another aspect of the invention, the shoulder block may be provided with a sipe extending substantially in parallel with the lateral inclined grooves.

As used herein, the tread edges refer to axially outermost edges of the ground contacting patch of the tread portion which occurs under a normally inflated loaded condition when the camber angle of the tire is zero. The normally inflated loaded condition is such that the tire is mounted on a standard wheel rim with a standard pressure, and is loaded with a standard tire load.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case of passenger vehicle tires, however, the standard pressure is uniformly defined by 180 kPa.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

DESCRIPTION OF THE PREFERRED EMBODIMENTS

An embodiment of the present invention will be explained below with reference to the accompanying drawings.

Figure 1:
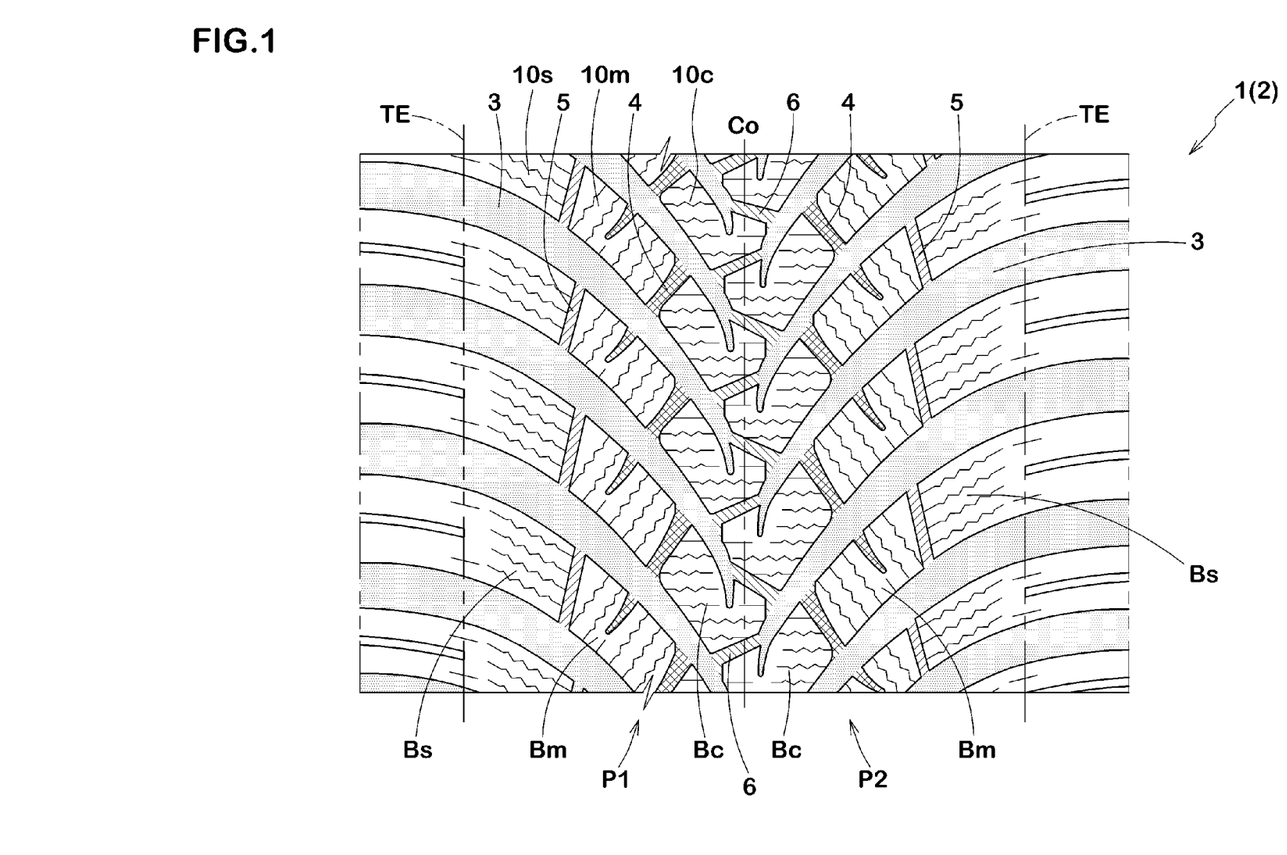
FIG. 1 is a development view of a tread pattern of a pneumatic tire according to an embodiment of the present invention.

As illustrated in FIG. 1, a pneumatic tire 1 according to the present embodiment, for example, is embodied as a winter tire that includes a tread portion 2 where any circumferentially and continuously extending straight main grooves are not provided.

The tread portion 2 includes a first tread pattern P1 formed between a tire equator Co and one of tread edges TE, and a second tread pattern P2 formed between the tire equator Co and the other one of the tread edges TE. The first tread pattern P1 and the second pattern P2 are formed as substantially symmetrical design with respect to the tire equator Co, wherein the first tread pattern P1 and the second pattern P2 are arranged such that pattern phases thereof are shifted one another in a circumferential direction of the tire.

Each of the first tread pattern P1 and the second tread pattern P2 is provided with a plurality of lateral inclined grooves 3 spaced in the circumferential direction of the tire, an axially inner connecting groove 4 connecting a pair of circumferentially adjacent lateral inclined grooves 3 and 3 on the side of the tire equator Co, and an axially outer connecting groove 5 connecting a pair of circumferentially adjacent lateral inclined grooves 3 and 3 on the side of the tread edge TE.

Furthermore, the tread portion 2 is provided with a plurality of central connecting grooves 6 arranged axially inward of the inner connecting grooves 4 of the first and second tread patterns P1 and P2, wherein each central connecting groove 6 extends across the tire equator Co, and connects one of the lateral inclined grooves 3 arranged on the first tread pattern P1 with one of the lateral inclined grooves 3 arranged on the second tread pattern P2.

Accordingly, the tread portion 2 is separated into a row of central blocks Bc each surrounded by a pair of circumferentially adjacent lateral inclined grooves 3, the inner connecting groove 4 and central connecting grooves 6, a row of middle blocks Bm each surrounded by a pair of circumferentially adjacent lateral inclined grooves 3, the inner connecting groove 4 and the outer connecting groove 5, and a row of shoulder blocks Bs each surrounded by a pair of circumferentially adjacent lateral inclined grooves 3, the outer connecting groove 5 and one of the tread edges Te.

Figure 2A:
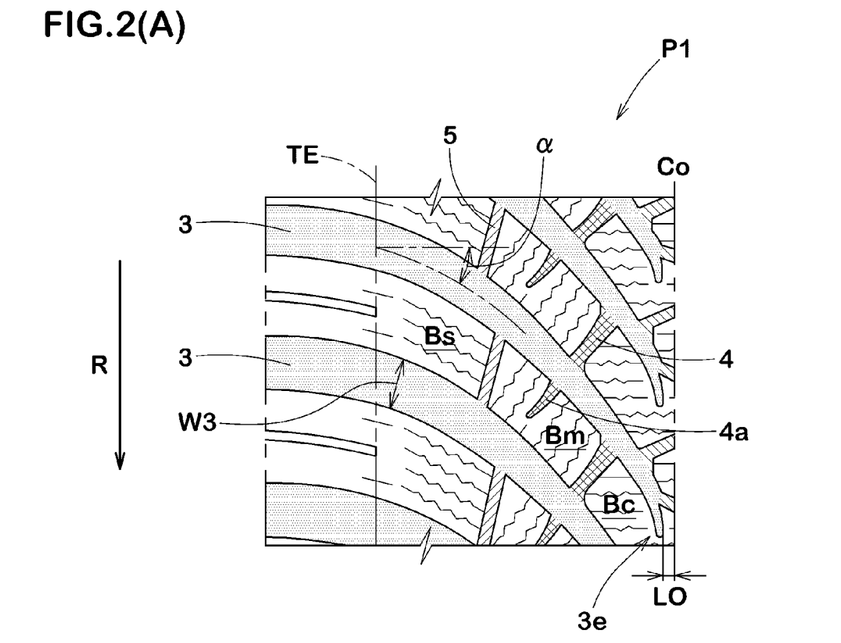
FIG. 2A is a partial enlarged view of a first tread pattern of the tread pattern illustrated in FIG. 1.

As illustrated in FIG. 2A, each lateral inclined groove 3 extends axially inwardly with an inclination from an axially outward position of the tread edge TE to an axially inner end 3e located near the tire equator Co without reaching the tire equator Co. In this embodiment, each lateral inclined groove 3 extends axially inwardly and forward in a rotational direction R specified in the tire, as shown in FIG. 2A. Furthermore, the lateral inclined groove 3 is formed as a curve groove having an angle $\alpha$ which gradually increases with respect to the axial direction of the tire. Furthermore, each lateral inclined groove 3 according to the present embodiment has a width W3 which gradually decreases toward the axially inner end 3e. Since this groove configuration can form a long compressed snow pillar which has strength gradually increasing toward the tread edge TE, it can offer an excellent steering stability while improving self cleaning feature of the lateral inclined grooves 3 where the compressed snow is easily removed from the grooves during traveling.

As used herein, the above-mentioned "near the tire equator" means an area or position which is located within at least 5 mm from the tire equator Co. Accordingly, the axial distance LO from the inner end 3e to the tire equator Co is preferably not more than 5 mm.

The inner connecting groove 4 has an opposite inclination to the inclination of the lateral inclined grooves 3. The intersection angle formed between the inner connecting groove 4 and the lateral inclined groove 3 may approach the right angle by inclining the inner connecting groove 4 in an opposite inclination to the lateral inclined groove 3.

Furthermore, the inner connecting groove 4 has an end that forms a T-shaped groove junction or a cross-shaped groove junction with one of the lateral inclined grooves 3. In this embodiment, the backward end (an axially inner end) of the inner connecting groove 4 terminates at the junction of the lateral inclined groove 3 so as to form the T-shaped groove junction, and the forward end (an axially outer end) of the inner connecting groove 4 extends beyond the lateral inclined groove 3 and terminates so as to form the cross-shaped groove junction. That is, the inner connecting groove 4 according to the present embodiment includes an extended portion 4a that extends across one of the lateral inclined grooves 3 and terminates within the middle block Bm.

The outer connecting groove 5 has an opposite inclination to the inclination of the lateral inclined grooves 3. The intersection angle formed between the outer connecting groove 5 and the lateral inclined groove 3 may approach the right angle by inclining the outer connecting groove 5 in an opposite inclination to the lateral inclined groove 3. Furthermore, the outer connecting groove 5 has an end that forms a T-shaped groove junction with one of the lateral inclined grooves 3.

Figure 2B:
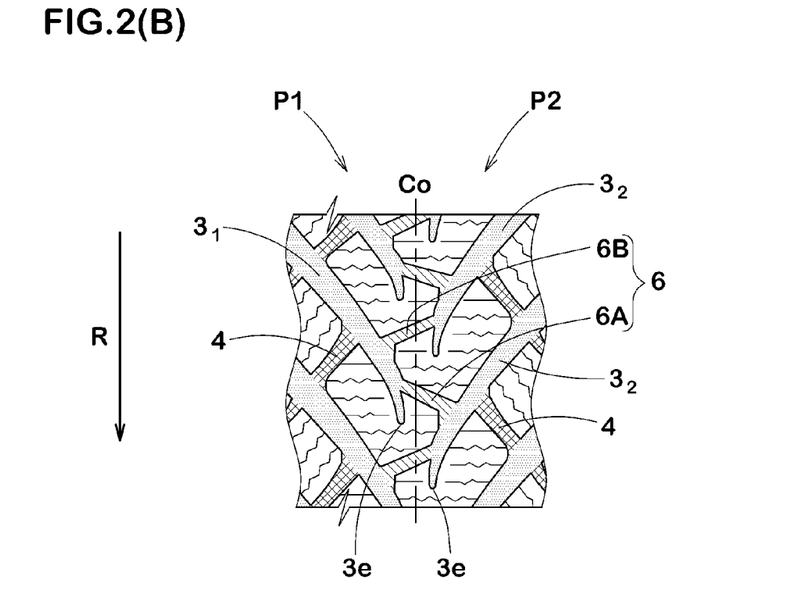
FIG. 2B is a partial enlarged view of a central region of the pattern.

As illustrated in FIG. 2B, each central connecting groove 6 connects one of the lateral inclined grooves 3 arranged on the first tread pattern P1 with one of the lateral inclined grooves 3 arranged on the second tread pattern P2, wherein the connecting grooves 6 are arranged in a zigzag manner. That is, a pair of central connecting grooves 6 have different inclination one another. The central connecting grooves 6 are arranged axially inward of the inner connecting grooves 4 and cross the tire equator Co. To help understanding, the lateral inclined grooves arranged in the first tread pattern P1 may be referred to as the lateral inclined grooves $3_1$, and the lateral inclined grooves arranged in the second tread pattern P2 may be referred to as the lateral inclined grooves $3_2$.

In this embodiment, the central connecting grooves 6 include a first central connecting groove 6A and a second central connecting groove 6B which are arranged alternately in the circumferential direction of the tire.

The first central connecting groove 6A connects one of the lateral inclined grooves $3_1$ arranged on the first tread pattern P1 with one of the lateral inclined grooves $3_2$ arranged on the second tread pattern P2, wherein the lateral inclined groove $3_2$ is located forward in the rotational direction R with respect to the concerned lateral inclined groove $3_1$. The first central connecting groove 6A is inclined in the same direction to the concerned lateral inclined groove $3_1$.

The second central connecting groove 6B connects one of the lateral inclined grooves $3_1$ arranged on the first tread pattern P1 with one of the lateral inclined grooves $3_2$ arranged on the second tread pattern P2, wherein the lateral inclined groove $3_2$ is located backward in the rotational direction R with respect to the concerned lateral inclined groove $3_1$. The second central connecting groove 6B is inclined in an opposite direction to the concerned lateral inclined groove $3_1$. The first central connecting grooves 6A and the second central connecting grooves 6B are arranged in line symmetric manner.

Since the pneumatic tire 1 in accordance with the present embodiment includes the lateral inclined grooves 3, the inner connecting grooves 4 and the outer connecting grooves 5 which are inclined with respect to the axial direction of the tire, these grooves 3, 4 and 5 can generate snow-shearing force in both the axial direction and the circumferential direction. Accordingly, the respective snow pillars formed in the respective grooves 3, 4 and 5 can support shearing force from the tread portion 2 when straight running, braking and cornering on snow. Furthermore, since the shearing force acts on the snow pillars in different direction to the width direction of the snow pillars in many traveling situations, it may be prevented that the snow pillars breaks easily during traveling. In addition, since the inner and outer connecting grooves 4 and 5 are inclined, the number of groove junctions on the lateral inclined grooves 3 may be increased as compared with a straight connecting groove, and therefore the tire in accordance with the present embodiment can form a high strength combined snow pillar through these grooves 3, 4 and 5. Furthermore, the respective high strength combined snow pillars formed in the first tread pattern P1 and the second tread pattern P2 are also joined through the snow pillar formed in the central connecting groove 6, and then it would have more high strength. As described above, the tire 1 in accordance with the present embodiment may improve steering stability on snow.

In this embodiment, the tread portion 2 is not provided any circumferentially and continuously extending straight main grooves, and is provided with the inner and outer connecting grooves 4 and 5 which have different inclination to the lateral inclined grooves 3. Thus, the shapes of the middle blocks Bm and the shoulder blocks Bs may tend to approach a rectangular shape having high rigidity. As a result, the tire according to the present embodiment may improve steering stability on dry road by increasing cornering power. In particular, in order to provide the blocks Bm and Bs with a rectangular shape, the angle of the inner connecting groove with respect to the axial direction of the tire is preferably set smaller than that of the outer connecting groove in view of the angle α of the lateral inclined groove which enlarges axially inwardly. In order to further improve steering stability on dry road, the angle of the central connecting groove 6 with respect to the axial direction of the tire is preferably set smaller than that of the inner connecting groove 4.

Figure 3:
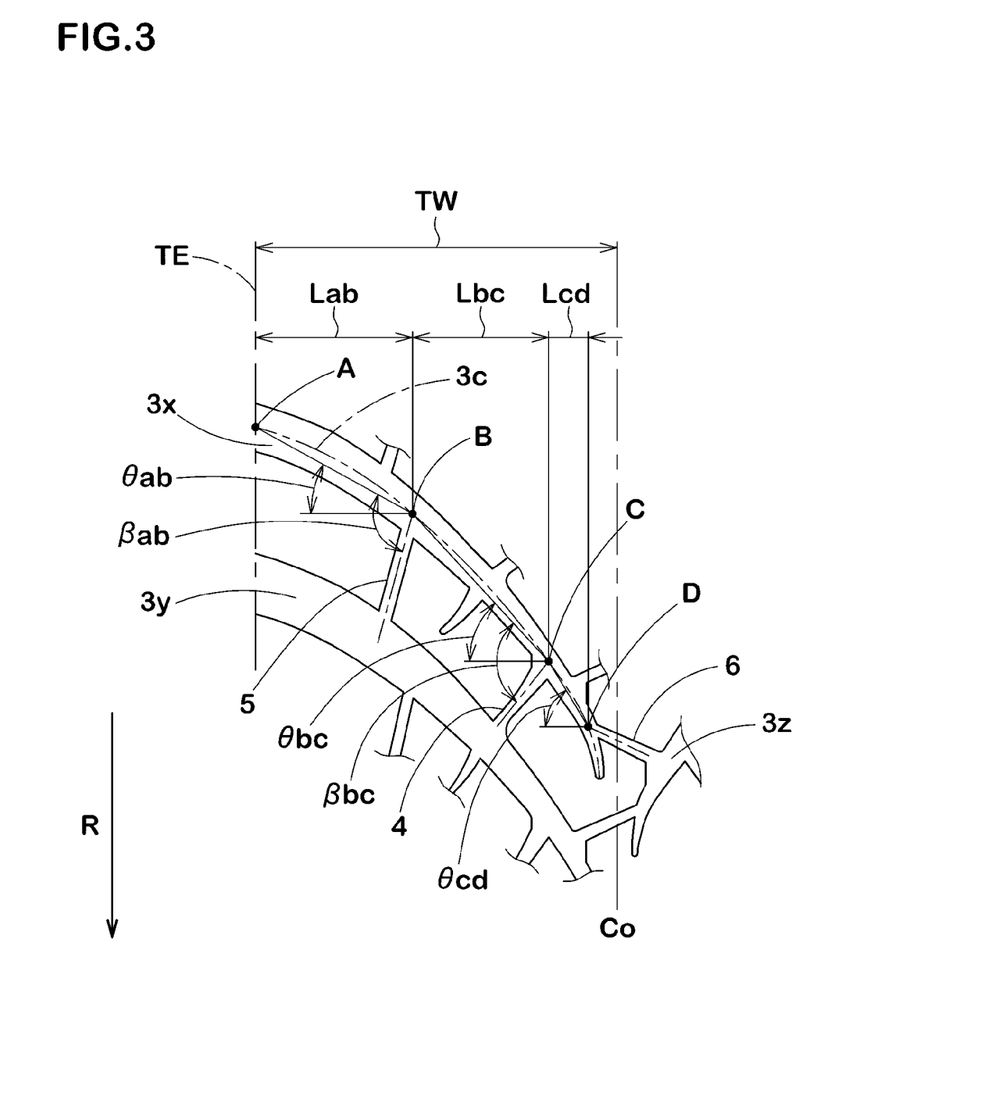
FIG. 3 is a partial enlarged view of the first tread pattern for explaining intersection points A to D.

FIG. 3 illustrates a pair of lateral inclined grooves 3x and 3y wherein the lateral inclined groove 3x is located backwardly with respect to the lateral inclined groove 3y in the rotational direction R. The lateral inclined groove 3x includes a groove center line 3c. The groove center line 3c includes an intersection point A with the tread edge Te, an intersection point B with the axially inner end of the outer connecting groove 5, an intersection point C with the axially inner end of the inner connecting groove 4 and an intersection point D with the central connecting groove 6, and angles θab, θbc and θcd satisfy the following relations:

θab<θbc<θcd,

25(deg.)<θab<35(deg.),

45(deg.)<θbc<55(deg.), and

55(deg.)<θcd<65(deg.), where "θab" is an angle of the segment AB extending from the point A to the point B with respect to the axial direction of the tire, "θbc" is an angle of the segment BC extending from the point B to the point C with respect to the axial direction of the tire, and "θcd" is an angle of the segment CD extending from the point C to the point D with respect to the axial direction of the tire.

Furthermore, in the pneumatic tire 1, an axial length Lab of the segment AB, an axial length Lbc of the segment BC, an axial length Lcd of the segment CD and a tread half width TW which is an axial distance measured from the tire equator Co to one of the tread edges TE satisfy the following relations:

Lab<Lbc<Lcd, 0.39×TW<=Lab<=0.47×TW, 0.33×TW<=Lbc<=0.41×TW, and 0.27×TW<=Lcd<=0.36×TW.

Since the angles θab, θbc and θcd satisfy the above mentioned relationship, steering stability on dry and snow can be improved in well balanced manner. When the angles θab, θbc and θcd are less than the ranges, the steering stability on snow may deteriorate due to reduction of lateral grip. On the other hand, when the angles θab, θbc and θcd are more than the ranges, steering stability on dry road may deteriorate due to reduction of block lateral rigidity. In particular, when the angle θab is excessively large, ground followability of a rear tire may deteriorate during cornering on dry road. Furthermore, when the angle θcd is excessively large, response of a front tire may deteriorate.

In the same point of view, since the lengths Lab, Lbc and Lcd satisfy the above mentioned relationship, steering stability on dry and snow can be improved in well balanced manner.

When the lengths Lab, Lbc and Lcd are more than the ranges, steering stability on snow may deteriorate due to reduction of lateral grip. On the other hand, the lengths Lab, Lbc and Lcd are less than the ranges, steering stability on dry road may deteriorate due to reduction of block lateral rigidity. In particular, when the length Lab is excessively small, ground followability of a rear tire may deteriorate during cornering on dry road. Furthermore, when the length Lcd is excessively small, response of a front tire may deteriorate.

Since the inner connecting groove 4 includes the extended portion 4a, the strength of the combined snow pillar can further be enhanced. In addition, since the extended portion 4a terminates within the respective middle blocks Bm, the block rigidity may be maintained to ensure steering stability on dry road.

In order to improve steering stability on dry road, the angle βab formed between the segment AB and the outer connecting groove 5 is preferably in a range of from 90 to 120 degrees. In the same point of view, the angle βbc formed between the segment BC and the inner connecting groove 4 is preferably in a range of from 90 to 120 degrees. When the angles βab and βbc are out of the ranges, steering stability on dry road may deteriorate due to reduction of block rigidity.

As illustrated in FIG. 1, in the pneumatic tire 1 according to the present embodiment, each central block Bc is provided with a sipe 10c extending substantially in the axial direction of the tire. Furthermore, each middle block Bm is provided with a sipe 10m extending substantially in parallel with the inner connecting groove 4. Furthermore, each shoulder block Bs is provided with a sipe 10s extending substantially in parallel with the lateral inclined grooves 3.

Since the sipe 10m of the middle block Bm extends substantially in parallel with the inner connecting groove 4, the block rigidity may be highly maintained to improve steering stability on dry road. Since the sipe 10s of the shoulder block Bs extends substantially in parallel with the lateral inclined grooves 3, it may be possible to provide a lot of long sipes in order to improve traction as well as braking performance on snow. Since the sipe 10c of the central block Bc extends substantially in the axial direction of the tire, it may offer different angle edge with respect to the sipes 10m and 10s. This configuration may improve steering stability on snow by offering various angle edges of sipes.

As used herein, the sipe 10c extending substantially in parallel with the axial direction of the tire means that the angle formed between the longitudinal direction of the sipe 10c and the axial direction of the tire is less than 10 degrees. As used herein the sipe 10m extending substantially in parallel with the inner connecting groove 4 means that the angle formed between the longitudinal direction of the sipe 10m and the centerline of the inner connecting groove 4 is less than 10 degrees. As used herein, the sipe 10s extending substantially in parallel with the lateral inclined grooves 3 means that the angle formed between the longitudinal direction of the sipe 10m and one of the centerline of the lateral inclined grooves 3 is less than 10 degrees.

Preferably, the pneumatic tire 1 has a land ratio of the tread pattern in a range of from 55% to 75% as same as the conventional winter tires. Furthermore, the tread rubber preferably has a durometer type-A hardness at 23 degrees Celsius in a range of from 45 to 70 degrees. In addition, the respective lateral inclined grooves 3, inner connecting groove 4, outer connecting grooves 5 and central connecting grooves 6 preferably have a depth in a range of from 5.0 to 6.0 mm.

While the embodiments in accordance with the present invention have been described in detail, the present invention is not limited to the illustrated embodiments, but can be modified and carried out in various aspects.

EXAMPLE

Winter tires having a basic tread pattern illustrated in FIG. 1 and a size of 195/65R15 were manufactured based on details shown in Table 1, and then steering stability on dry and snow of each tire was tested. As for a reference tire, the tire which is provided with four straight main grooves instead of the axially inner and outer connecting grooves 4 and 5 are tested. The main groove have the same width as the axially inner and outer connecting grooves 4 and 5. Each test tire has the same configuration except the details shown in Table 1. The common specifications of tires and test procedures are as follows.

Land ratio: 68%
Tread ground contact width (2×TW): 140 mm
Groove depths: 8.5 mm
Tread rubber hardness of durometer type-A: 65 degrees
Steering stability on snow test:
  Each test tire was mounted on a passenger car having a displacement of 2,000 cc as all the wheels under the following conditions. Then, a test driver drove the test car on a test course covered with snow, and evaluated the steering stability by his feeling. The results are indicated using a score of a maximum 10. The larger the value, the better the performance is.
Rim: 15×60
Internal pressure: Front 200 kPa, Rear 200 kPa
Steering stability on dry test:
  Using the same test car, the test driver drove the test car on a test course of a dry asphalt road, and evaluated the steering stability by his feeling. The results are indicated using a score of a maximum 10. The larger the value, the better the performance is.

From the test results, it has been confirmed that the example tires improve total performance of steering stability on dry and snow in well balanced manner as compared with the reference tire.

TABLE 1

| | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Circumferential straight main groove | Presence | None | None | None | None | None | None | None | None | None | None | None |
| Inner connecting groove | None | Presence | Presence | Presence | Presence | Presence | Presence | Presence | Presence | Presence | Presence | Presence |

TABLE 1-continued

|  | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Extended portion | None | Presence | Presence | Presence | Presence | Presence | Presence | Presence | Presence | Presence | Presence | None |
| Outer connecting groove | None | Presence | Presence | Presence | Presence | Presence | Presence | Presence | Presence | Presence | Presence | Presence |
| lateral inclined groove | Presence | Presence | Presence | Presence | Presence | Presence | Presence | Presence | Presence | Presence | Presence | Presence |
| Angle θab (deg.) | 30 | 30 | 26 | 34 | 26 | 30 | 30 | 45 | 30 | 30 | 30 | 30 |
| Angle θbc (deg.) | 50 | 50 | 46 | 54 | 54 | 50 | 50 | 60 | 50 | 50 | 50 | 50 |
| Angle θcd (deg.) | 60 | 60 | 56 | 64 | 64 | 60 | 60 | 70 | 60 | 60 | 60 | 60 |
| Length Lab (mm) | 30 | 30 | 30 | 30 | 30 | 28 | 28 | 30 | 28 | 25 | 30 | 30 |
| Length Lbc (mm) | 26 | 26 | 26 | 26 | 26 | 28 | 28 | 26 | 29 | 30 | 26 | 26 |
| Length Lcd (mm) | 22 | 22 | 22 | 22 | 22 | 22 | 24 | 22 | 22 | 22 | 30 | 22 |
| Steering stability on dry | 7 | 10 | 10 | 8 | 9 | 9 | 8 | 7 | 8 | 8 | 8 | 10 |
| Steering stability on snow | 8 | 10 | 9 | 10 | 10 | 10 | 10 | 10 | 9 | 9 | 9 | 9 |
| Total score | 15 | 20 | 19 | 18 | 19 | 19 | 18 | 17 | 17 | 17 | 17 | 19 |

What is claimed is:

1. A pneumatic tire comprising:
a tread portion comprising a first tread pattern formed between a tire equator and one of tread edges, and a second tread pattern formed between the tire equator and the other one of the tread edges,
wherein
the first tread pattern and the second pattern are formed as a substantially symmetrical design with respect to the tire equator, the first tread pattern and the second pattern being arranged such that pattern phases thereof are shifted from one another in a circumferential direction of the tire,
each of the first tread pattern and the second tread pattern is provided with a plurality of lateral inclined grooves each extending axially inwardly with an inclination from the tread edge to an axially inner end located near the tire equator without reaching the tire equator, an axially inner connecting groove having an opposite inclination to the inclination of the lateral inclined grooves and connecting between a pair of circumferentially adjacent lateral inclined grooves, and an axially outer connecting groove having an opposite inclination to the inclination of the lateral inclined grooves and connecting between a pair of circumferentially adjacent lateral inclined grooves;
a plurality of central connecting grooves are arranged axially inward of the inner connecting grooves of the first and second tread patterns, each central connecting groove extending across the tire equator and connecting one of the lateral inclined grooves arranged on the first tread pattern with one of the lateral inclined grooves arranged on the second tread pattern; and
each of the lateral inclined grooves comprises a groove center line, the groove center line comprises an intersection point A with the tread edge, an intersection point B with an axially inner end of the outer connecting groove, an intersection point C with an axially inner end of the inner connecting groove and an intersection point D with the central connecting groove, and angles θab, θbc and θcd satisfy the following relationships:

θab<θbc<θcd,

25(deg.)<θab<35(deg.),

45(deg.)<θbc<55(deg.), and

55(deg.)<θcd<65(deg.), where "θab" is an angle of a segment AB extending from the point A to the point B with respect to an axial direction of the tire, "θbc" is an angle of a segment BC extending from the point B to the point C with respect to the axial direction of the tire, and "θcd" is an angle of a segment CD extending from the point C to the point D with respect to the axial direction of the tire.

2. The pneumatic tire according to claim 1, wherein the tread portion is not provided with any circumferentially and continuously extending straight main grooves.

3. The pneumatic tire according to claim 1, wherein the outer connecting groove has an end that forms a T-shaped groove junction with one of the lateral inclined grooves, the inner connecting groove has an end that forms a T-shaped groove junction or a cross-shaped groove junction with one of the lateral inclined grooves, and the central connecting groove has an end that forms a T-shaped groove junction with one of the lateral inclined grooves.

4. The pneumatic tire according to claim 1, wherein an axial length Lab of the segment AB, an axial length Lbc of the segment BC and an axial length Lcd of the segment CD satisfy the following relations:

Lab<Lbc<Lcd, 0.39×TW≤Lab≤0.47×TW, 0.33×TW≤Lbc≤0.41×TW, and 0.27×TW≤Lcd≤0.36×TW, where "TW" is a tread half width which is an axial distance measured from the tire equator to one of the tread edges.

5. The pneumatic tire according to claim 1, wherein the tread portion comprises a central block surrounded by a pair of circumferentially adjacent lateral inclined grooves, the inner connecting groove and a pair of central connecting groove, a middle block surrounded by a pair of circumferentially adjacent lateral inclined grooves, the inner connecting groove and the outer connecting groove, and a shoulder block surrounded by a pair of circumferentially adjacent lateral inclined grooves, the outer connecting groove and one of the tread edges.

6. The pneumatic tire according to claim 5, wherein the inner connecting groove comprises an extended portion that extends across one of the lateral inclined grooves and terminates within the middle block.

7. The pneumatic tire according to claim 5, wherein the central block is provided with a sipe extending substantially in an axial direction of the tire.

8. The pneumatic tire according to claim 5, wherein the middle block is provided with a sipe extending substantially in parallel with the inner connecting groove.

9. The pneumatic tire according to claim 5, wherein the shoulder block is provided with a sipe extending substantially in parallel with the lateral inclined grooves.

10. A pneumatic tire comprising:
a tread portion comprising a first tread pattern formed between a tire equator and one of tread edges, and a second tread pattern formed between the tire equator and the other one of the tread edges,
wherein
the first tread pattern and the second pattern are formed as a substantially symmetrical design with respect to the tire equator, the first tread pattern and the second pattern being arranged such that pattern phases thereof are shifted from one another in a circumferential direction of the tire,
each of the first tread pattern and the second tread pattern is provided with a plurality of lateral inclined grooves each extending axially inwardly with an inclination from the tread edge to an axially inner end located near the tire equator without reaching the tire equator, an axially inner connecting groove having an opposite inclination to the inclination of the lateral inclined grooves and connecting between a pair of circumferentially adjacent lateral inclined grooves, and an axially outer connecting groove having an opposite inclination to the inclination of the lateral inclined grooves and connecting between a pair of circumferentially adjacent lateral inclined grooves;
a plurality of central connecting grooves are arranged axially inward of the inner connecting grooves of the first and second tread patterns, each central connecting groove extending across the tire equator and connecting one of the lateral inclined grooves arranged on the first tread pattern with one of the lateral inclined grooves arranged on the second tread pattern;
the tread portion comprises a central block surrounded by a pair of circumferentially adjacent lateral inclined grooves, the inner connecting groove and a pair of central connecting grooves, a middle block surrounded by a pair of circumferentially adjacent lateral inclined grooves, the inner connecting groove and the outer connecting groove, and a shoulder block surrounded by a pair of circumferentially adjacent lateral inclined grooves, the outer connecting groove and one of the tread edges; and
the central block is provided with a sipe extending substantially in an axial direction of the tire.

11. A pneumatic tire comprising:
a tread portion comprising a first tread pattern formed between a tire equator and one of tread edges, and a second tread pattern formed between the tire equator and the other one of the tread edges,
wherein
the first tread pattern and the second pattern are formed as a substantially symmetrical design with respect to the tire equator, the first tread pattern and the second pattern being arranged such that pattern phases thereof are shifted from one another in a circumferential direction of the tire,
each of the first tread pattern and the second tread pattern is provided with a plurality of lateral inclined grooves each extending axially inwardly with an inclination from the tread edge to an axially inner end located near the tire equator without reaching the tire equator, an axially inner connecting groove having an opposite inclination to the inclination of the lateral inclined grooves and connecting between a pair of circumferentially adjacent lateral inclined grooves, and an axially outer connecting groove having an opposite inclination to the inclination of the lateral inclined grooves and connecting between a pair of circumferentially adjacent lateral inclined grooves;
a plurality of central connecting grooves are arranged axially inward of the inner connecting grooves of the first and second tread patterns, each central connecting groove extending across the tire equator and connecting one of the lateral inclined grooves arranged on the first tread pattern with one of the lateral inclined grooves arranged on the second tread pattern;
the tread portion comprises a central block surrounded by a pair of circumferentially adjacent lateral inclined grooves, the inner connecting groove and a pair of central connecting grooves, a middle block surrounded by a pair of circumferentially adjacent lateral inclined grooves, the inner connecting groove and the outer connecting groove, and a shoulder block surrounded by a pair of circumferentially adjacent lateral inclined grooves, the outer connecting groove and one of the tread edges; and
the middle block is provided with a sipe extending substantially in parallel with the inner connecting groove.

12. A pneumatic tire comprising:
a tread portion comprising a first tread pattern formed between a tire equator and one of tread edges, and a second tread pattern formed between the tire equator and the other one of the tread edges,
wherein
the first tread pattern and the second pattern are formed as a substantially symmetrical design with respect to the tire equator, the first tread pattern and the second pattern being arranged such that pattern phases thereof are shifted from one another in a circumferential direction of the tire,
each of the first tread pattern and the second tread pattern is provided with a plurality of lateral inclined grooves each extending axially inwardly with an inclination from the tread edge to an axially inner end located near the tire equator without reaching the tire equator, an axially inner connecting groove having an opposite inclination to the inclination of the lateral inclined grooves and connecting between a pair of circumferentially adjacent lateral inclined grooves, and an axially outer connecting groove having an opposite inclination to the inclination of the lateral inclined grooves and connecting between a pair of circumferentially adjacent lateral inclined grooves;
a plurality of central connecting grooves are arranged axially inward of the inner connecting grooves of the first and second tread patterns, each central connecting groove extending across the tire equator and connecting one of the lateral inclined grooves arranged on the first tread pattern with one of the lateral inclined grooves arranged on the second tread pattern;
the tread portion comprises a central block surrounded by a pair of circumferentially adjacent lateral inclined grooves, the inner connecting groove and a pair of central connecting grooves, a middle block surrounded by a pair of circumferentially adjacent lateral inclined grooves, the inner connecting groove and the outer connecting groove, and a shoulder block surrounded by a pair of circumferentially adjacent lateral inclined grooves, the outer connecting groove and one of the tread edges; and the shoulder block is provided with a sipe extending substantially in parallel with the lateral inclined grooves.

* * * * *